United States Patent
Damizet et al.

(10) Patent No.: US 11,578,891 B2
(45) Date of Patent: Feb. 14, 2023

(54) ADJUSTABLE ADJUSTER FROM A FIRST END AND A SECOND END OF THE ADJUSTER

(71) Applicant: ALDES AERAULIQUE, Venissieux (FR)

(72) Inventors: Patrick Damizet, La Chapelle Villars (FR); Fabien Bertran, Toulouse (FR); Xavier Loigerot, Lyons (FR)

(73) Assignee: ALDES AERAULIQUE, Venissieux (FR)

( * ) Notice: Subject to any disclaimer, the term of this patent is extended or adjusted under 35 U.S.C. 154(b) by 445 days.

(21) Appl. No.: 16/521,239

(22) Filed: Jul. 24, 2019

(65) Prior Publication Data

US 2020/0033022 A1    Jan. 30, 2020

(30) Foreign Application Priority Data

Jul. 24, 2018 (FR) ..................................... 18/56837

(51) Int. Cl.
*F24F 13/14* (2006.01)
*F24F 11/74* (2018.01)
*F16K 31/53* (2006.01)

(52) U.S. Cl.
CPC ............. *F24F 13/14* (2013.01); *F24F 11/74* (2018.01); *F16K 31/53* (2013.01)

(58) Field of Classification Search
CPC ........ F24F 13/14; F24F 13/1426; F24F 11/74; F24F 11/75; F24F 2013/1446; F24F 2013/146; F16K 31/53; F16K 31/535

USPC ........................................................ 454/333
See application file for complete search history.

(56) References Cited

U.S. PATENT DOCUMENTS

| | | | |
|---|---|---|---|
| 3,338,140 A | 8/1967 | Sheesley | |
| 5,346,130 A * | 9/1994 | Rademaker | F24F 13/06 454/258 |
| 7,533,691 B2 * | 5/2009 | Marcoux | F24F 13/1426 137/523 |
| 2006/0172694 A1 * | 8/2006 | Gau | F24F 11/76 454/333 |
| 2009/0095106 A1 | 4/2009 | Hollender et al. | |
| 2015/0031280 A1 * | 1/2015 | Barbarin | F24F 13/10 454/256 |
| 2015/0204575 A1 * | 7/2015 | Kotlowski | F24F 11/75 454/256 |
| 2017/0234574 A1 * | 8/2017 | Marak | F24F 11/72 454/333 |

FOREIGN PATENT DOCUMENTS

EP    1881278 A1    1/2008

* cited by examiner

*Primary Examiner* — Avinash A Savani
*Assistant Examiner* — Dana K Tighe
(74) *Attorney, Agent, or Firm* — Cantor Colburn LLP

(57) ABSTRACT

An adjustment device designed to adjust a flow rate of a fluid flowing in a duct, including a body in which an adjustment valve is mounted, movable in rotation about an adjustment axis, the body having an area upstream of the adjustment axis and a downstream area opposite to the upstream area with respect to the adjustment axis, where the adjustment axis is equipped with connecting means which cooperate with at least one first control member positioned in the downstream area and a second control member positioned in the upstream area.

8 Claims, 4 Drawing Sheets

ADJUSTABLE ADJUSTER FROM A FIRST END AND A SECOND END OF THE ADJUSTER

CROSS REFERENCE TO RELATED APPLICATION

This application is related to and claims the benefit of French Patent Application Number 18/56837 filed on Jul. 24, 2018, the contents of which are herein incorporated by reference in their entirety.

TECHNICAL FIELD

The disclosure concerns a device for adjusting a flow rate of a fluid flowing in a duct.

BACKGROUND

Subsequently, for clarity purposes, the fluid considered as an example will be air, the duct will be therefore a duct called «aeraulic duct». However, an identical reasoning might be made for any fluid circulating in a duct.

The buildings receiving people, in particular the housings or the tertiary premises such as schools or offices, generally include a system for ventilating the different rooms, called controlled mechanical ventilation «CMV», to renew the air of these rooms by bringing in outside air and by extracting stale air inside the premises. The main purpose of renewal of the air of the rooms is to evacuate pollutions related to the presence of the occupants, the presence of equipment or machines used in its premises, as well as those emitted by the building itself.

The buildings may also include a heating and/or air conditioning aeraulic installation allowing bringing an air flow into a room so as to increase and/or decrease the temperature of said room.

More generally, the controlled mechanical ventilation systems or the heating and/or air conditioning aeraulic installations in which an air flow, also called airflow, is transported by aeraulic ducts, generally forming an aeraulic network, between at least one inlet and at least one outlet.

More specifically, the aeraulic duct comprises an inner face delimiting an internal area. The internal area of the aeraulic duct is accessible from an end of the aeraulic duct.

Subsequently, it will be considered that the air flow rate is an air volume flow rate.

The air flow rate passing through the aeraulic duct corresponds to an air volume passing through a given surface per unit of time. The flow rate is generally expressed in m$^3$/s. It varies depending on the air speed, that is to say the air pressure, and a passage section of the aeraulic duct, that is to say an inner surface of the aeraulic duct determined transversely to an axis of elongation of the aeraulic duct. Consequently, for a given pressure, a maximum flow rate of the aeraulic duct is determined depending on the passage section. In the case of a tubular aeraulic duct, the passage section varies depending on the diameter of the duct.

In order to split the air flow rate in the aeraulic ducts depending on the requirements of each room, it is necessary to be able to adjust said air flow rate, that is to say to decrease the maximum flow rate of air passing through the aeraulic duct to at a determined adjustment value.

There is a known a solution allowing adjusting the air flow rate passing through the aeraulic duct by modifying the passage section of the aeraulic duct.

For example, the patent document EP1881278 discloses a device designed to be introduced into an aeraulic duct, including a tubular body in which an adjustment valve is fastened allowing determining the passage section of the air flow and a regulation flap pivotally fastened on an axis, allowing maintaining a substantially identical flow rate regardless of the air pressure variations in the aeraulic duct.

More specifically, the tubular body comprises an inner wall delimiting an inner volume and an outer wall opposite to said inner wall. A sealing gasket is positioned on the outer wall. Furthermore, the tubular body has a first end and a second end.

The tubular body allows for a mechanical strength of the adjustment valve and of the regulation flap.

The adjustment valve extends in a plane. The adjustment valve has at least partially a shape substantially identical to the passage section of the aeraulic duct into which the device is intended to be inserted. The adjustment valve comprises a pivoting position about an adjustment axis and a fixed position in the device.

The adjustment valve is configured so as to at least partially reduce the passage section of said aeraulic duct depending on the desired flow rate.

In order to adjust a flow rate, a technician puts the adjustment valve in the pivoting position and modifies the position of the adjustment valve by means of an adjustment element, then the technician puts the adjustment valve in the fixed position. The adjustment valve is then fixed in the position allowing adjusting the desired flow rate.

The position of the adjustment valve is modified manually by a technician by means of an adjustment element.

The adjustment element comprises a setpoint wheel present on the outer wall of the tubular body, said setpoint wheel being connected to the adjustment axis of the adjustment valve. A modification in the position of the adjustment valve is made by turning the setpoint wheel.

The insertion of the device into the aeraulic duct is delicate.

Indeed, during the insertion, frictions are exerted between the aeraulic duct and the adjustment device which may cause a displacement of the sealing gasket on the body of the device and a degradation thereof. Then, there is no longer a perfect adjustment between the device and the aeraulic duct.

It is defined that an area upstream of the tubular body is an area comprised between the adjustment axis and a first end of the tubular body and the downstream area is an area comprised between the adjustment axis and a second end of the tubular body.

The adjustment device includes a mounting direction, that is to say that the device is positioned in a duct depending on a flow direction of the fluid. When inserted into a duct, the upstream area is positioned opposite a fluid flow, that is to say that the flow meets, in the direction of the flow, the upstream area and then the downstream area of the adjustment device.

When the technician wishes to modify the air flow rate passing through the aeraulic duct, that is to say when the technician wishes to modify the position of the adjustment valve, he must remove the device from the aeraulic duct so as to access the adjustment element positioned between the device and the aeraulic duct. He can thus actuate the adjustment element and then put the device back into the aeraulic duct.

Thus, a modification in the adjustment of the adjustment valve involves many manipulations of the device requiring a lot of time, and a risk of degrading and improperly repositioning the device in the aeraulic duct resulting in a decrease in the performance of the device.

A modification in the adjustment of the adjustment valve also results in a risk of error in the direction of the mounting of the adjustment device.

Finally, the removal of the device may require a disassembly of a portion of the aeraulic duct then involving additional manipulations by the technician.

BRIEF SUMMARY

The disclosure overcomes all or part of the aforementioned drawbacks by proposing, an adjustment device designed to adjust a flow rate of a fluid flowing in a duct, comprising a body in which an adjustment valve is mounted movable in rotation about an adjustment axis, said body comprising an area upstream of the adjustment axis and a downstream area opposite to the upstream area with respect to the adjustment axis, characterized in that the adjustment axis is equipped with connecting means which cooperate with at least one first control member positioned in the downstream area and a second control member positioned in the upstream area.

The first control member and the second control member are configured so that an action on said first control member or on said second control member interacts with the connecting means in order to modify a position of the adjustment valve.

Thus, with the adjustment device according to the disclosure, it is possible to modify the position of the adjustment valve from the upstream area and the downstream area.

When the adjustment device is positioned in the duct, according to the flow direction of the fluid, the technician easily accesses, where appropriate, the upstream area or the downstream area of the adjustment device. In doing so, the technician easily accesses, that is to say without having to extract the adjustment device from the duct, the first control member or the second control member. The technician can thus modify the position of the adjustment valve without removing the adjustment device from the duct.

Ultimately, the modification in the adjustment of the adjustment device according to the disclosure is faster and requires less manipulation than with an adjustment device according to the state of the art.

According to a feature of the disclosure, the connecting means are fastened to a first termination of the adjustment axis and/or to a second termination of the adjustment axis.

According to a feature of the disclosure, the connecting means comprise at least one drive element configured so as to drive in rotation the adjustment axis.

The drive element is configured so as to drive in rotation the adjustment axis depending on an action applied on the first control member or on the second control member. In doing so, the drive element drives in rotation the adjustment valve.

According to a feature of the disclosure, the drive element extends in an adjustment plane substantially normal to the adjustment axis.

According to a feature of the disclosure, the drive element is movable in rotation about the adjustment axis.

According to a feature of the disclosure, the at least one drive element comprises notches.

Thus, the notches determine possible positions of the adjustment axis.

According to a feature of the disclosure, each of the at least one first control member and the second control member comprises a complementary drive element configured to cooperate with the drive element.

The complementary drive element is configured to cooperate with the drive element so that an action on the first control member or on the second control member results in the modification of the position of the adjustment valve.

According to a feature of the disclosure, the complementary drive element extends in a plane normal to the adjustment axis.

According to a feature of the disclosure, the complementary drive element of the first control member is connected with the complementary drive element of the second control member.

Thus, an action on the first control member further results in a symmetrical action on the second control member.

The first control member and the second control member extend in the same plane normal to the adjustment axis.

According to a feature of the disclosure, the complementary drive element of the first control member and/or of the second control member is movable in rotation.

Thus, the first control member and/or the second control member is movable in rotation.

According to a feature of the disclosure, the complementary drive element of the first control member and/or of the second control member is movable in translation.

According to a feature of the disclosure, the complementary drive element of the first control member and/or of the second control member comprises a helical spline.

The helical spline is configured to cooperate with the notches of the drive element so as to form a bevel gear, that is to say that an axis of rotation of the complementary drive element is not in the same plane as an axis of rotation of the drive element, allowing transmitting a movement of the complementary drive element to the drive element.

A rotation of the complementary drive element drives in rotation the drive element.

The rotation of the complementary drive element is carried out according to an axis substantially transverse to the adjustment axis.

The complementary drive element also allows maintaining the drive element in a determined position after the adjustment without it being necessary to block said drive element.

According to a feature of the disclosure, the first control member and the second control member comprise a portion specifically adapted for a gripping by a technician.

According to a feature of the disclosure, the portion of the first control member and of the second control member forms a wheel.

According to a feature of the disclosure, the first control member and the second control member are offset by several centimeters relative to the rod.

According to a feature of the disclosure, the adjustment device comprises at least one first position indicator positioned in the downstream area and a second position indicator positioned in the upstream area.

The first position indicator and the second position indicator are configured to indicate a position of the adjustment valve. Thus, when the technician exerts an action on the first control member or on the second control member, the positions of the adjustment valve and of the position indicators are modified.

When the adjustment device is positioned in the duct, according to the flow direction of the fluid, the technician easily accesses, where appropriate, the upstream area or the downstream area of the adjustment device. In doing so, the technician can easily visualize, that is to say without having to extract the adjustment device from the duct, the position of the first position indicator or of the second position indicator.

According to a feature of the disclosure, the first position indicator and the second position indicator extend in a plane normal to the adjustment axis.

According to a feature of the disclosure, each of the at least first position indicator and the second position indicator comprises an elongation.

According to a feature of the disclosure, the elongation of the at least one first position indicator and/or the second position indicator comprises an oblong recess.

According to a feature of the disclosure, the adjustment valve comprises at least one complementary position indicator configured so as to cooperate with an elongation.

Thus, the elongation is configured to cooperate with the complementary position indicator of the adjustment valve.

A movement of the complementary position indicator results in a movement of the first position indicator and/or of the second position indicator.

According to a feature of the disclosure, the complementary position indicator comprises at least one pin.

According to a feature of the disclosure, the at least one pin extends in a direction substantially parallel to the adjustment axis.

According to a feature of the disclosure, the elongation of the first position indicator is connected to the elongation of the second position indicator.

Thus, a modification of the position of the first position indicator, respectively of the second position indicator, results in a modification in the position of the second position indicator, respectively of the first position indicator.

According to a feature of the disclosure, the at least one first position indicator and the second position indicator are movable in rotation.

More specifically, the at least one first position indicator and/or the second position indicator comprises an axis of rotation centered relative to the upstream area and the downstream area. The axis of rotation of the at least one first position indicator and/or the second position indicator is therefore separated from the adjustment axis.

BRIEF DESCRIPTION OF THE DRAWINGS

The disclosure will be better understood, thanks to the following description, which relates to several embodiments according to the present disclosure, provided as non-limiting examples and explained with reference to the appended schematic drawings, in which.

DETAILED DESCRIPTION

Figure 1:
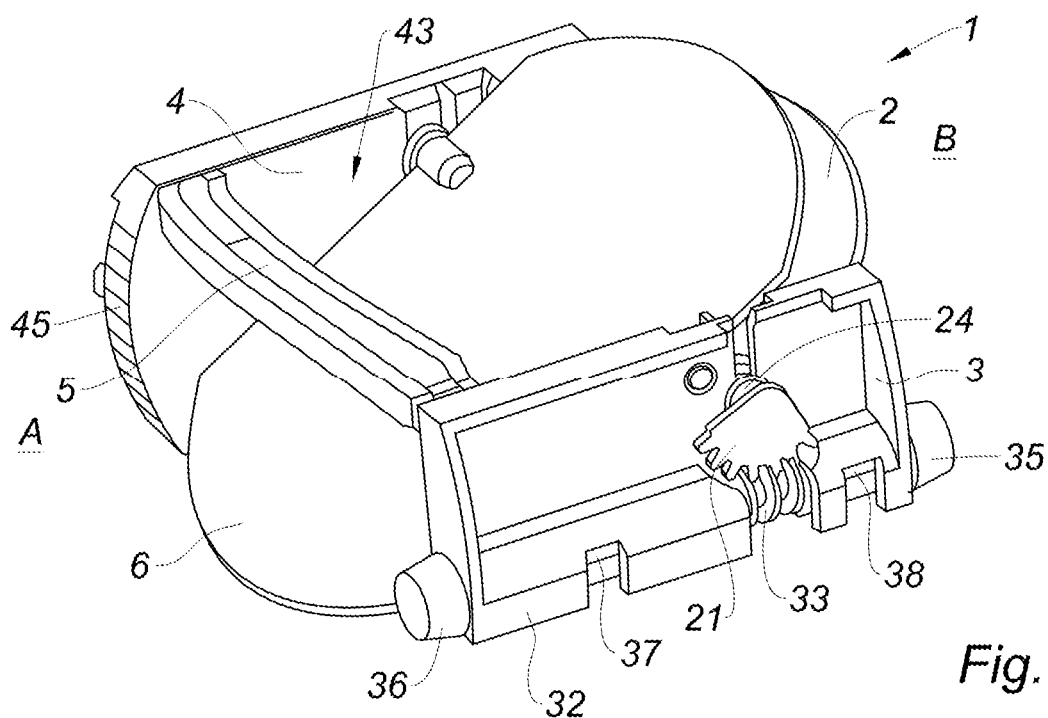
FIG. 1 is a top view representation of an adjustment device according to a first embodiment.

The remainder of the description covers 2 embodiments of an adjustment device according to the disclosure, with reference to FIGS. 1 to 7 in which the elements or members, that are structurally or functionally identical or similar, are designated by identical reference numerals.

Figure 2:
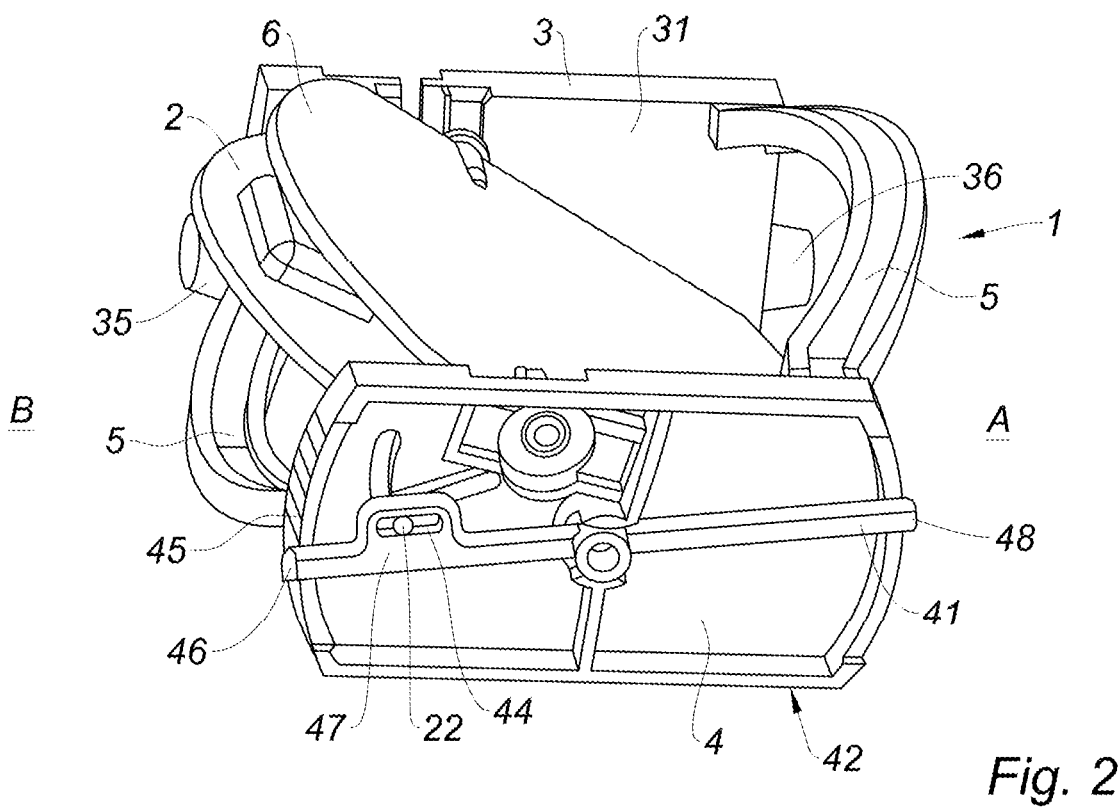
FIG. 2 is a bottom view representation of the adjustment device according to the first embodiment.

FIGS. 1 and 2 represent an adjustment device 1 according to a first embodiment comprising a body in which an adjustment valve 2 is mounted.

The adjustment valve 2 has a substantially semicircular shape, that is to say half-disk shaped. The adjustment valve 2 comprises an adjustment axis. Said adjustment axis is held at the level of a first termination 24 by a first base 3 of the body and at the level of a second termination by a second base 4 of the body. The adjustment valve 2 is mounted movable in rotation about said adjustment axis.

An upstream area A of the body is an area comprised between the adjustment axis and a first end of the adjustment device 1 and a downstream area B is an area comprised between the adjustment axis and a second end of the adjustment device 1.

The first base 3 has a substantially rectangular shape and comprises an outer face 32 opposite to an inner face 31. The inner face 31 comes into contact with the adjustment axis of the adjustment valve 2. The first base 3 extends in a plane normal to the adjustment axis.

The second base 4 has a substantially rectangular shape, with a length and a width substantially identical to a length and a width of the first base 3. The second base 4 comprises an outer face 42 opposite to an inner face 43. The inner face 43 comes into contact with the adjustment axis of the adjustment valve 2. The second base 4 extends in a plane normal to the adjustment axis distinct from the plane in which the first base 3 extends.

The first base 3 and the second base 4 define a volume in which two stiffening axes 5 are comprised. The stiffening axes 5 connect the inner face 31 of the first base 3 and the inner face 43 of the second base 4. Furthermore, the stiffening axes 5 comprise a substantially rounded portion so as to facilitate the handling of the adjustment device 1. The stiffening axes 5 determine a mechanical strength of the adjustment device 1.

The adjustment device 1 further comprises a regulation flap 6. The regulation flap 6 extends in a plane. The regulation flap 6 has a substantially circular shape. The regulation flap 6 is movable in rotation about a regulation axis parallel and distinct from the adjustment axis of the adjustment flap 2.

The adjustment valve 2 and the regulation flap 6 are held in a position substantially parallel to each other by a return member 7. Thus, a modification in the position of the regulation flap 2 results in a modification in the position of the regulation flap 6.

The adjustment axis of the adjustment flap 2 is equipped at the level of the first termination 24 with connecting means extending in a plane substantially normal to the adjustment axis.

The connecting means comprise a drive member 21 which has a quarter-disk shape including an arc provided with notches.

The connecting means cooperate with a first control member 35 and with a second control member 36.

The first control member 35 is positioned in the downstream area B of the adjustment device 1 and the second control member 36 is positioned in the upstream area A of the adjustment device 1.

Each of the first control member 35 and the second control member 36 comprises a control wheel movable in rotation.

Each of the first control member 35 and the second control member 36 comprises a complementary drive element 37, 38. The complementary drive element 38 of the first control member 35 is connected with the complementary drive element 37 of the second control member 36.

Subsequently, in order to simplify the description, the term «complementary drive element 37, 38» will be used to refer to the complementary drive element 38 of the first control member 35 and of the second control member 36.

The complementary drive element 37, 38 comprises a helical spline 33.

The drive element 21 cooperates with a complementary drive element 37, 38.

The notches of the drive element 21 are configured to interact with the helical spline 33 of the complementary drive element 37, 38, such that when a technician rotates the first control member 35 or the second control member 36, the complementary drive element 37, 38 rotates about its axis of elongation and the drive element 21 rotates about the adjustment axis. The adjustment valve 1 then changes position.

The connecting means, the first control member 35 and the second control member 36 are positioned across a thickness of the first base 3.

The adjustment valve 2 also comprises a complementary position indicator 22 extending according to an axis parallel to the adjustment axis.

The complementary position indicator 22 comprises a pin cooperating with an oblong recess 44 of an elongation 47 of a first position indicator 46.

The first position indicator 46 is positioned in the downstream area B of the adjustment device 1.

The first position indicator 46 is connected to a second position indicator 48 positioned in the upstream area A of the adjustment device 1.

The second position indicator 48 comprises an elongation 41 connected to the elongation 47 of the first position indicator 46.

The first position indicator 46 and the second position indicator 48 are mounted movable in rotation about an axis positioned substantially equidistant from the upstream area A and the downstream area B.

The first position indicator 46 and the second position indicator 48 extend transversely to the adjustment axis across a thickness of the second base 4.

The second base 4 comprises on a first edge and on a second edge a position scale 45 configured to cooperate respectively with the first position indicator 46 and the second position indicator 48.

When the adjustment valve 2 changes position, the complementary position indicator 22 also changes position in an orifice of the second base 4. The complementary position indicator 22 inserted into the oblong recess 44 drives in rotation the first position indicator 46 which drives the second position indicator 48. The first position indicator 46 and the second position indicator 48 therefore modify their position with respect to the position scale 45. In this manner, the first position indicator 46 and the second position indicator 48 indicate the position of the adjustment valve 2.

Figure 3:
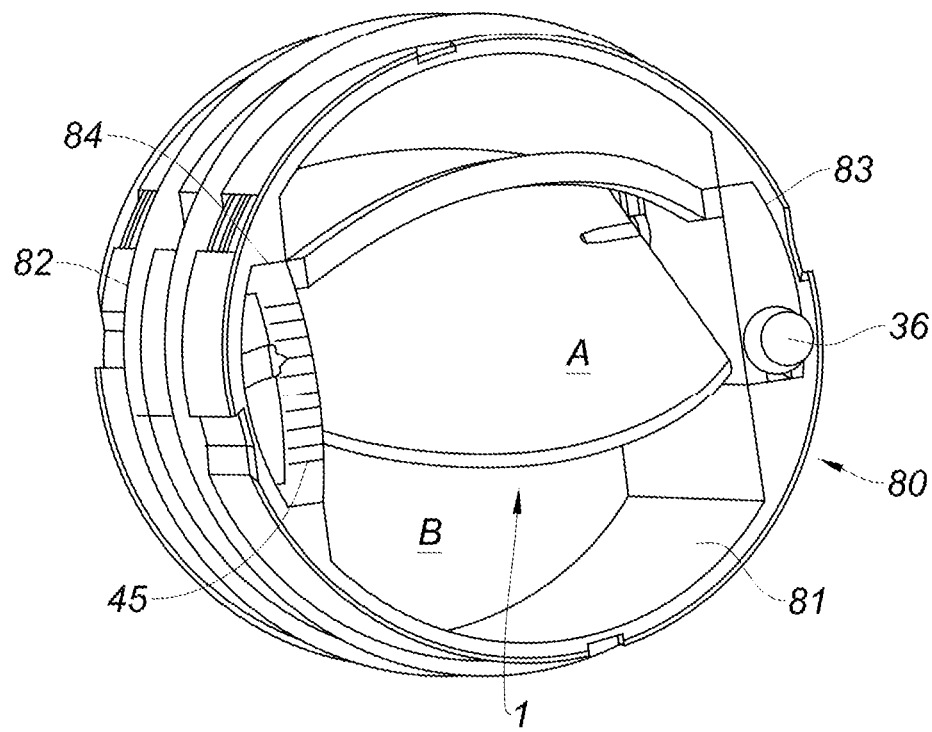
FIG. 3 is a view of an upstream area of the adjustment device according to the first embodiment, said adjustment device being integrated into a sleeve.
Figure 4:
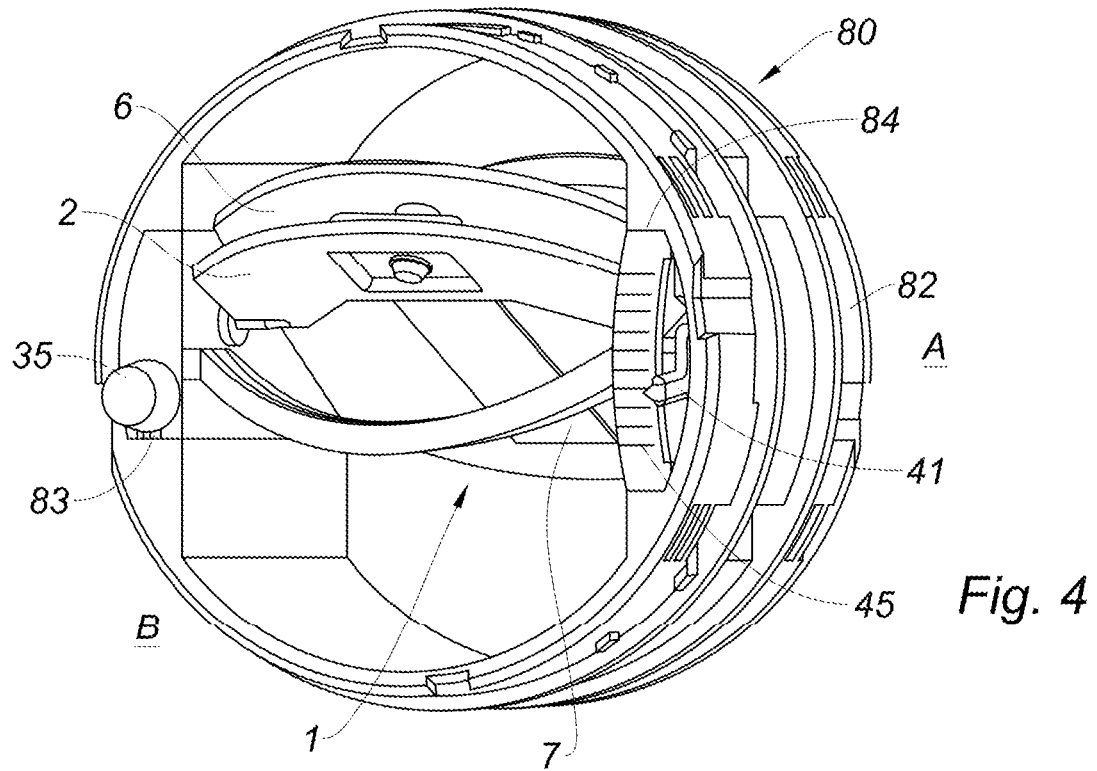
FIG. 4 is a representation viewed from an area downstream of the adjustment device according to the first embodiment, said adjustment device being integrated into the sleeve.

The adjustment device 1 is designed to be directly inserted into an aeraulic duct or into a sleeve 80 as illustrated in FIGS. 3 and 4.

When a technician wishes to insert the adjustment device 1 into the aeraulic duct, he grasps said adjustment device 1 then directs it depending on a circulation direction of a flow rate of air passing through said aeraulic duct.

He positions the upstream area A of the adjustment device opposite the airflow, that is to say that the airflow meets, in a direction of the flow, the upstream area A then the downstream area B of the adjustment device 1.

The technician chooses a position of the adjustment valve 2 depending on the adjustment of the air flow rate to be made. For this purpose, he turns one of the control members 35, 36 so that the first 46 or the second 48 position indicator reaches the desired position on the position scale 45.

The technician then brings the outer faces 32, 42 of the first base 3 and of the second base 4 into contact with an inner face of the aeraulic duct. Frictions exerted between the outer faces of the first base 3 and of the second base 4, and the inner face of the aeraulic duct hold the adjustment device 1 in the aeraulic duct.

The adjustment valve 2 and the regulation flap 6 thus partially seal the aeraulic duct so as to adjust the air flow rate.

The regulation flap 6 allows maintaining a substantially identical flow rate regardless of the pressure variations present in the aeraulic duct.

When the adjustment device 1 is inserted into a sleeve 80, the sleeve 80 is subsequently inserted into the aeraulic duct.

The sleeve 80 has a tubular shape, that is to say that a passage section is circular, comprising an inner wall 81 defining an inner volume of said sleeve 80 and an outer wall 82 opposite to the inner wall 81.

The sleeve 80 further comprises a first aperture 83, and a second aperture 84, whose length and width are substantially equal to a length and a width of the first base 3, respectively of the second base 4, of the adjustment device 1 with which they are intended to cooperate.

When the technician inserts the adjustment device 1 into the sleeve 80, he grasps, on the one hand, the sleeve 80 and, on the other hand, the adjustment device 1. Then he orients the adjustment device 1 so as to put the first base 3 opposite the first aperture 83 and the second base 4 opposite the second aperture 84. Afterwards, he slides the adjustment device 1 into the inner volume of the sleeve 80. The bases 3, 4 of the adjustment device 1 are then held in the apertures 83, 84 of the sleeve 80.

When the adjustment device 1 is inserted into the sleeve 80, the first control member 35 and the second control member 36 are respectively accessible from a first end of the sleeve and a second end of the sleeve.

The sleeve 80 is designed to be introduced into an aeraulic duct such that the outer face 82 is in contact with the inner face of said aeraulic duct.

Figure 5:
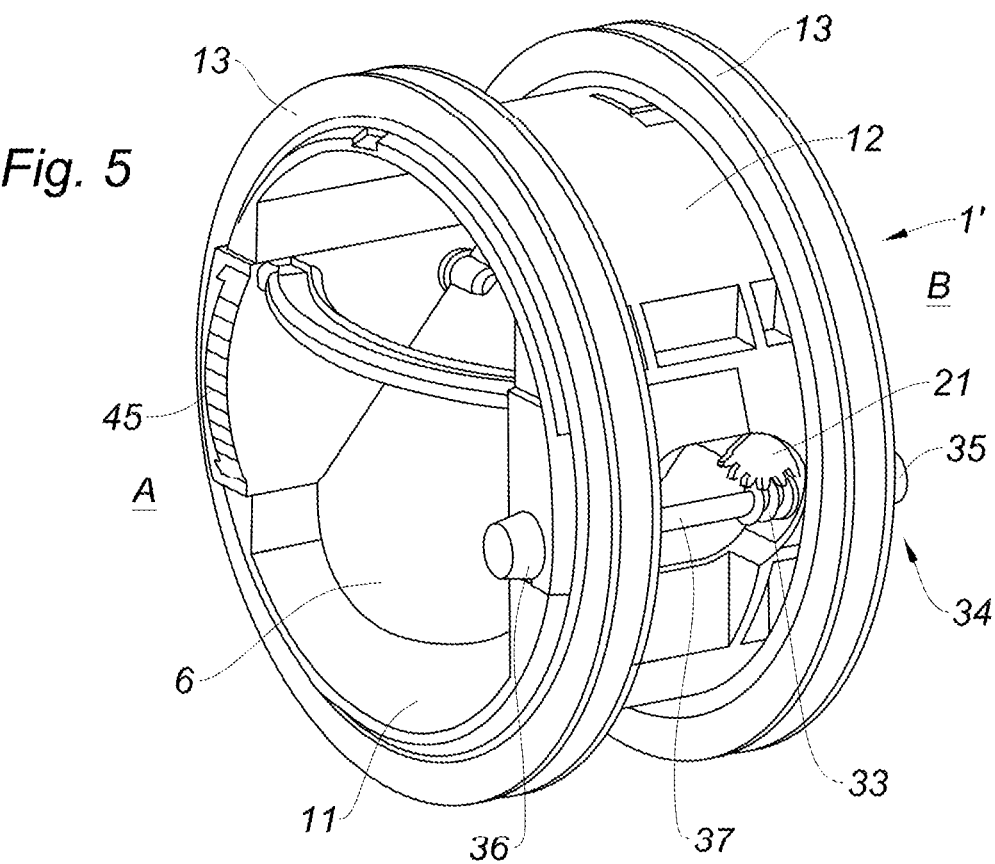
FIG. 5 is a representation of an adjustment device according to a second embodiment.
Figure 6:
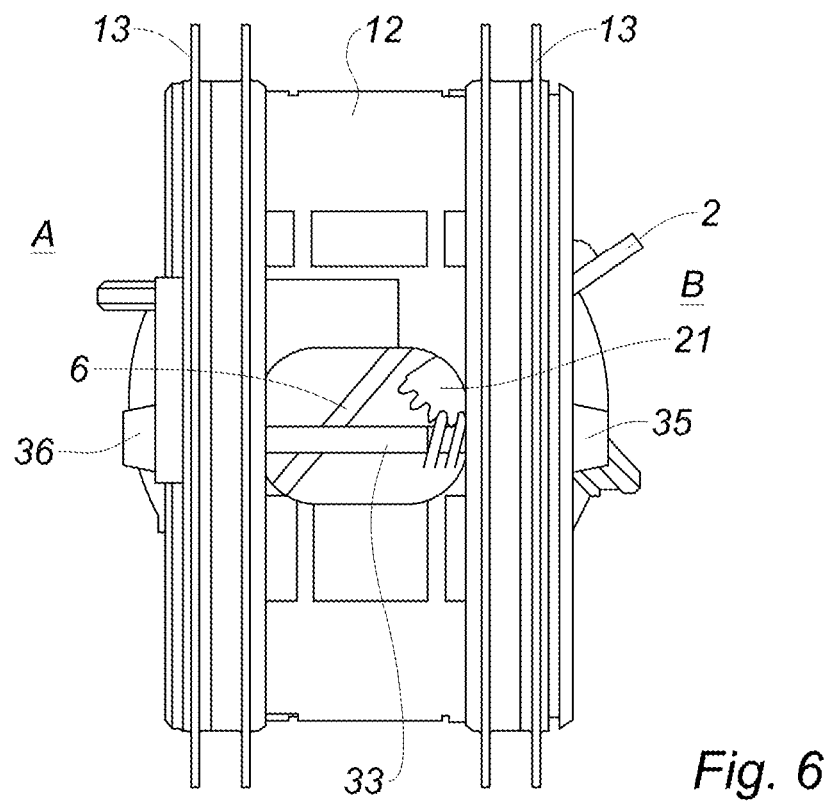
FIG. 6 is a side view of the adjustment device according to FIG. 5.
Figure 7:
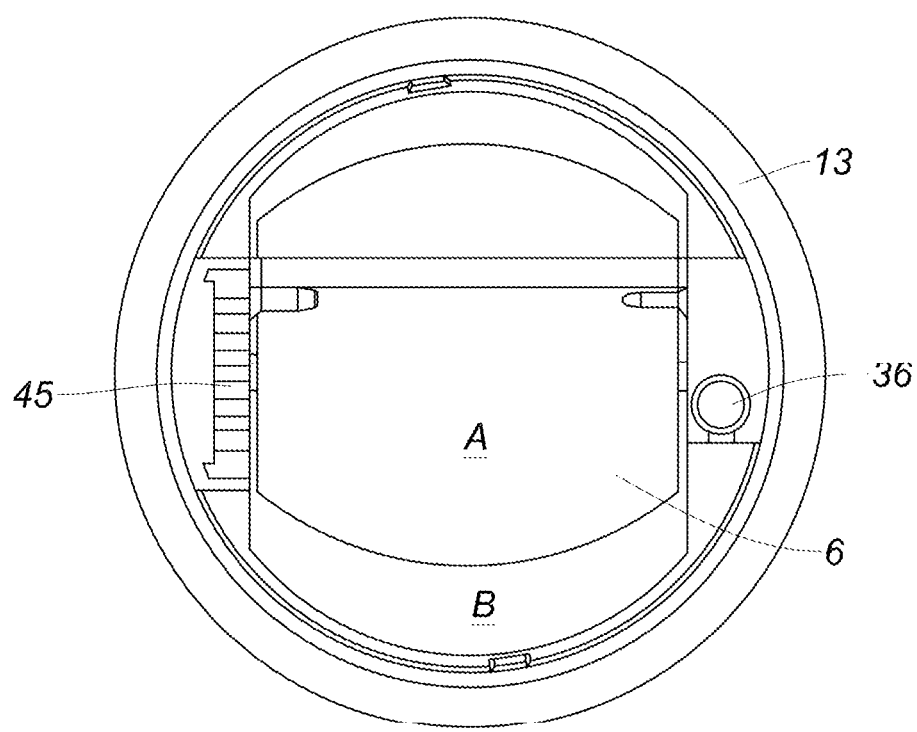
FIG. 7 is a view of an upstream area of the adjustment device according to FIG. 5.

FIGS. 5, 6 and 7 represent an adjustment device 1' according to a second embodiment designed to be introduced into the aeraulic duct.

The adjustment device 1' according to the second embodiment differs from the adjustment device 1 in that it comprises a tubular body in which an adjustment valve 2 and a regulation flap 6 are fastened.

The tubular body comprises an inner wall 11 delimiting an inner volume and an outer wall 12 opposite to said inner wall 11. The tubular body allows for a mechanical strength of the adjustment valve 2 and of the regulation flap 6.

The tubular body also comprises, across a thickness thereof, a first control element 35 and a second control element 36.

The tubular body also comprises, across a thickness thereof, a first position indicator, and a second position indicator movable in rotation similar to the first position indicator 46 and the second position indicator 48 described in the first embodiment of the adjustment device.

The outer wall 12 of the tubular body comprises 2 sealing gaskets 13.

When the adjustment device 1' is inserted into an aeraulic duct such that the outer face 12 is in contact with the inner face of said aeraulic duct, the sealing gaskets 13 enable all the fluid to pass into the adjustment device 1'.

The first control member 35 and the second control member 36 are accessible respectively from a first end of the adjustment device 1' and a second end of the adjustment device 1'.

Thus, the technician accesses a control member 35, 36 regardless of the direction of introduction of the adjustment device 1' into the aeraulic duct.

Of course, the disclosure is not limited to the embodiments described and represented in the appended figures. Modifications are still possible, in particular with regards to the constitution of the various elements or by substitution of technical equivalents, yet without departing from the scope of the disclosure.

The invention claimed is:

1. An adjustment device designed to adjust manually a flow rate of a fluid flowing in a duct, comprising a body in which an adjustment valve is mounted, movable in rotation about an adjustment axis, said body comprising an area upstream of the adjustment axis and a downstream area opposite to the upstream area with respect to the adjustment axis, wherein the adjustment axis is equipped with connecting means which cooperate with at least one first control member positioned in the downstream area and a second control member positioned in the upstream area the first control member and the second control member comprise a portion specifically for a gripping by a technician, wherein each of the at least one first control member and the second control member comprises a complementary drive element configured to cooperate with the drive element, wherein the complementary drive element of the at least one first control member and/or of the second control member comprises a helical spline.

2. The adjustment device according to claim 1, wherein the connecting means comprise at least one drive element configured so as to drive in rotation the adjustment axis.

3. The adjustment device according to claim 2, wherein the at least one drive element comprises notches.

4. The adjustment device according to claim 1, wherein the complementary drive element of the at least one first control member is connected with the complementary drive element of the second control member.

5. The adjustment device according to claim 1, comprising at least one first position indicator positioned in the downstream area and a second position indicator positioned in the upstream area.

6. The adjustment device according to claim 5, wherein each of the at least one first position indicator and the second position indicator comprises an elongation.

7. The adjustment device according to claim 6 wherein the adjustment valve comprises at least one complementary position indicator configured so as to cooperate with at least one of the elongations.

8. The adjustment device according to claim 7, wherein the elongation of the first position indicator is connected to the elongation of the second position indicator.

\* \* \* \* \*